United States Patent
Osawa

(10) Patent No.: US 7,462,669 B2
(45) Date of Patent: Dec. 9, 2008

(54) CATIONIC EMULSION COMPOSITION OF HIGH POLYMERIC ORGANOSILOXANE AND PREPARATION THEREOF

(75) Inventor: Yoshihito Osawa, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 95 days.

(21) Appl. No.: 11/421,218

(22) Filed: May 31, 2006

(65) Prior Publication Data

US 2006/0270789 A1 Nov. 30, 2006

(30) Foreign Application Priority Data

May 31, 2005 (JP) .............................. 2005-158971

(51) Int. Cl.
C08G 77/06 (2006.01)
C08L 83/04 (2006.01)

(52) U.S. Cl. ...................................... 524/837; 524/860

(58) Field of Classification Search ................. 524/860, 524/837

See application file for complete search history.

(56) References Cited

U.S. PATENT DOCUMENTS

| | | | |
|---|---|---|---|
| 3,231,404 A * | 1/1966 | Ferrigno | 106/287.15 |
| 4,480,009 A * | 10/1984 | Berger | 428/447 |
| 4,704,272 A * | 11/1987 | Oh et al. | 510/122 |
| 5,470,930 A * | 11/1995 | Toba et al. | 526/204 |
| 5,504,149 A | 4/1996 | Kosal | |
| 5,504,150 A * | 4/1996 | Gilson et al. | 524/837 |
| 5,661,215 A * | 8/1997 | Gee et al. | 524/837 |
| 5,684,085 A * | 11/1997 | Gee et al. | 516/53 |
| 5,998,537 A * | 12/1999 | Good et al. | 524/588 |
| 6,201,063 B1 * | 3/2001 | Halloran et al. | 524/838 |
| 6,211,125 B1 * | 4/2001 | Crudele et al. | 510/122 |
| 6,235,834 B1 * | 5/2001 | Gee et al. | 524/837 |
| 6,274,130 B1 * | 8/2001 | Murray | 424/70.12 |
| 6,297,318 B1 * | 10/2001 | Halloran et al. | 524/838 |
| 6,316,541 B1 * | 11/2001 | Gee | 524/714 |
| 6,355,233 B1 * | 3/2002 | Bergmann et al. | 424/70.12 |
| 6,627,698 B2 * | 9/2003 | Wrolson et al. | 524/837 |
| 2003/0059393 A1 * | 3/2003 | Wrolson et al. | 424/70.12 |
| 2003/0091523 A1 * | 5/2003 | Dhamdhere et al. | 424/70.12 |
| 2003/0095943 A1 * | 5/2003 | Barbuzzi et al. | 424/70.27 |
| 2006/0075576 A1 * | 4/2006 | Price et al. | 8/115.51 |
| 2006/0193817 A1 * | 8/2006 | Uehara et al. | 424/70.122 |

FOREIGN PATENT DOCUMENTS

| | | | |
|---|---|---|---|
| JP | 41-13995 | | 8/1966 |
| JP | 56-38609 | | 9/1981 |
| JP | 8-104752 | | 4/1996 |
| JP | 9-137062 | | 5/1997 |
| JP | 9-278626 | | 10/1997 |
| JP | 10-140480 | | 5/1998 |
| JP | 2001-106787 | | 4/2001 |
| WO | WO 94/02021 | * | 2/1994 |

* cited by examiner

Primary Examiner—Randy Gulakowski
Assistant Examiner—Robert Loewe
(74) Attorney, Agent, or Firm—Oblon, Spivak, McClelland, Maier & Neustadt, P.C.

(57) ABSTRACT

A high polymeric organosiloxane cationic emulsion composition comprising (A) a polydiorganosiloxane of formula: HO—$[R_2SiO]_n$—H wherein R is an organic group and n is a number to give a viscosity of at least 300 Pa-s at 25° C., (B) a cationic surfactant of formula: $Q_3(CH_3)N^+ \cdot X^-$ wherein Q is an organic group and X is halogen or carboxyl, and (C) water is fully stable. It is prepared by dispersing a corresponding organosiloxane and the cationic surfactant in water to form an emulsion, polymerizing in the presence of an alkali catalyst at 0-90° C. for 10-150 hours, and neutralizing with an acidic compound.

18 Claims, No Drawings

CATIONIC EMULSION COMPOSITION OF HIGH POLYMERIC ORGANOSILOXANE AND PREPARATION THEREOF

CROSS-REFERENCE TO RELATED APPLICATION

This non-provisional application claims priority under 35 U.S.C. §119(a) on Patent Application No. 2005-158971 filed in Japan on May 31, 2005, the entire contents of which are hereby incorporated by reference.

TECHNICAL FIELD

This invention relates to cationic emulsion compositions of high polymeric organosiloxanes which are useful as textile treating agents, cosmetic ingredients and the like, and a method for the preparation thereof.

BACKGROUND ART

Polyorganosiloxanes have been used as textile treating agents, mold release agents, water repellents, cosmetic ingredients and the like because they impart smoothness and water repellency to substrates which are treated therewith. Among others, organosiloxanes having a high degree of polymerization are very effective in imparting smoothness. While surfactants are used in emulsifying polysiloxanes, cationic surfactants such as quaternary ammonium salts are known to improve the adsorption of polysiloxane to substrates. There is an increased demand for the emulsions in which organosiloxanes having a high degree of polymerization are emulsified with the aid of cationic surfactants.

A general polysiloxane emulsifying method is to emulsify and disperse a polysiloxane and a surfactant in water in an emulsifier by applying mechanical shear. No stable emulsions are obtained from organosiloxanes having a high degree of polymerization because their extreme viscosity impedes uniform application of mechanical shear.

One known approach for producing high polymeric polysiloxane emulsions is an emulsion polymerization method of conducting polymerization of a siloxane monomer in emulsion form in the presence of an acid or alkali catalyst as disclosed in JP-B 41-13995 and JP-B 56-38609. In this emulsion polymerization method, however, when cationic surfactants such as quaternary ammonium salts, typically cetyltrimethylammonium chloride are used, the rate of polymerization is very slow, requiring a long period of time until a high degree of polymerization is reached. Even when polymerization is continued for a period of about 150 hours which is considered the commercially permissible maximum, the polysiloxane has been polymerized to only such an extent as to give a viscosity of several ten Pa-s as extracted.

Other known approaches for producing cationic emulsions of high polymeric polysiloxanes include polymerization with silanolate catalysts as disclosed in U.S. Pat. No. 5,504,149 (JP-A 08-104752) and polymerization with ammonium hydroxide catalysts as disclosed in JP-A 2001-106787. The degree of polymerization is insufficient in these methods.

It is also proposed in JP-A 09-137062 and JP-A 10-140480 to produce a high polymeric polysiloxane emulsion with the aid of an anionic surfactant, followed by addition of a cationic surfactant. A problem of stability arises from the combined use of anionic and cationic surfactants.

Polymerization in two stages of different temperature is proposed in JP-A 09-278626, yet taking a long time of polymerization until a high degree of polymerization is reached.

DISCLOSURE OF THE INVENTION

An object of the present invention is to provide a cationic emulsion composition of high polymeric organosiloxane which is fully stable and useful as textile treating agents, cosmetic ingredients and the like, and a method for preparing the cationic emulsion composition within a relatively short period of time.

The inventor has found that by dispersing (D) a cyclic organosiloxane of formula: $[R_2SiO]_x$ wherein R is a monovalent organic group of 1 to 20 carbon atoms and x is a positive number of 3-20 and/or a hydroxy-terminated polydiorganosiloxane of formula: $HO-[R_2SiO]_y-H$ wherein R is as defined above and y is a positive number of 2-100, optionally (E) an organoalkoxysilane of formula: $(YO)_2SiR_2$ wherein Y is an alkyl group of 1 to 6 carbon atoms and R is as defined above, and (B) a cationic surfactant of formula: $Q_3(CH_3)N^+\cdot X^-$ wherein Q is a monovalent organic group of 6 to 30 carbon atoms and X is a halogen atom or monovalent carboxyl group of 1 to 6 carbon atoms, in water to form an emulsion, allowing polymerization to proceed in the presence of an alkali catalyst at 0-90° C. for 10-150 hours, and neutralizing with an acidic compound, the emulsion can be polymerized within a relatively short period of time to yield a cationic emulsion composition comprising (A) a high polymeric polydiorganosiloxane of formula: $HO-[R_2SiO]_n-H$ wherein R is as defined above and n is a positive number, having a viscosity of at least 300,000 mPa-s at 25° C.; and that this emulsion composition is fully stable.

In one aspect, the present invention provides a cationic emulsion composition of high polymeric organosiloxane comprising (A) 100 parts by weight of a polydiorganosiloxane of the general formula: $HO-[R_2SiO]_n-H$ wherein R is each independently a monovalent organic group of 1 to 20 carbon atoms and n is a positive number, having a viscosity of at least 300,000 mPa-s at 25° C., (B) 0.1 to 30 parts by weight of a cationic surfactant of the general formula: $Q_3(CH_3)N^+\cdot X^-$ wherein Q is each independently a monovalent organic group of 6 to 30 carbon atoms and X is a halogen atom or monovalent carboxyl group of 1 to 6 carbon atoms, and (C) 30 to 3,000 parts by weight of water.

In another aspect, the present invention provides a method for preparing the cationic emulsion composition defined above, comprising the steps of dispersing components (D), (E), (B) and (C) to form an emulsion, allowing the emulsion to polymerize in the presence of an alkali catalyst at 0 to 90° C. for 10 to 150 hours, and neutralizing with an acidic compound, (D) 100 parts by weight of a cyclic organosiloxane of the general formula: $[R_2SiO]_x$ wherein R is each independently a monovalent organic group of 1 to 20 carbon atoms and x is a positive number of 3 to 20 and/or a hydroxy-terminated polydiorganosiloxane of the general formula: $HO-[R_2SiO]_y-H$ wherein R is as defined above and y is a positive number of 2 to 100, (E) 0 to 20 parts by weight of an organoalkoxysilane of the general formula: $(YO)_2SiR_2$ wherein Y is an alkyl group of 1 to 6 carbon atoms and R is as defined above, (B) 0.1 to 30 parts by weight of a cationic surfactant of the general formula: $Q_3(CH_3)N^+X^-$ wherein Q is each independently a monovalent organic group of 6 to 30 carbon atoms and X is a halogen atom or monovalent carboxyl group of 1 to 6 carbon atoms, and (C) 30 to 3,000 parts by weight of water.

BENEFITS OF THE INVENTION

The cationic emulsion composition of high polymeric organosiloxane is useful as textile treating agents, cosmetic ingredients and the like. The method for preparing the cationic emulsion composition is of great worth in the industry because the composition can be obtained by a relatively short time of polymerization.

DESCRIPTION OF THE PREFERRED EMBODIMENTS

As used herein, the term "high polymeric" organosiloxane means that the organosiloxane has a high degree of polymerization.

The cationic emulsion composition of high polymeric organosiloxane of the invention comprises (A) a polydiorganosiloxane of the general formula: HO—[$R_2SiO$]$_n$—H wherein R is each independently a monovalent organic group of 1 to 20 carbon atoms and n is a positive number, having a viscosity of at least 300,000 mPa-s at 25° C., (B) a cationic surfactant of the general formula: $Q_3(CH_3)N^+X^-$ wherein Q is each independently a monovalent organic group of 6 to 30 carbon atoms and X is a halogen atom or monovalent carboxyl group of 1 to 6 carbon atoms, and (C) water.

The polydiorganosiloxane (A) having a viscosity of at least 300,000 mPa-s at 25° C. is represented by the general formula: HO—[$R_2SiO$]$_n$—H. In the formula, R may be the same or different and is a monovalent organic group of 1 to 20 carbon atoms and n is such a positive number that the polydiorganosiloxane has a viscosity of at least 300,000 mPa-s at 25° C.

Examples of suitable monovalent $C_1$-$C_{20}$ organic groups represented by R include alkyl groups such as methyl, ethyl, propyl, butyl, pentyl, hexyl, heptyl, octyl, nonyl, decyl, dodecyl, tetradecyl, hexadecyl, octadecyl, cyclopentyl, cyclohexyl and cycloheptyl; aryl groups such as phenyl, tolyl and naphthyl; alkenyl groups such as vinyl and allyl; and substituted forms of the foregoing organic groups in which some hydrogen atoms are substituted by halogen atoms or organic groups containing a polar group such as amino, acryloxy, methacryloxy, epoxy or mercapto. It is desired from the industrial and property aspects that at least 90% of R be methyl.

The letter n is such a positive number that the polydiorganosiloxane has a viscosity of at least 300,000 mPa-s at 25° C. If the viscosity of polydiorganosiloxane is less than 300,000 mPa-s at 25° C., the substrate treated with the composition is improved little in softness and smoothness. For this reason, the polydiorganosiloxane should have a viscosity of at least 300,000 mPa-s at 25° C. and preferably at least 500,000 mPa-s at 25° C. It is noted that throughout the specification, the viscosity is measured by a rotational viscometer at 25° C.

The polydiorganosiloxane may further contain minor amounts of [$R_3SiO_{1/2}$] units, [$RSiO_{3/2}$] units and [$SiO_2$] units as long as they do not compromise softness and smoothness.

Component (B) is a cationic surfactant for assisting in emulsification and dispersion of the polydiorganosiloxane in water. It has the general formula: $Q_3(CH_3)N^+X^-$ wherein Q is each independently a monovalent organic group of 6 to 30 carbon atoms and X is a halogen atom or monovalent carboxyl group of 1 to 6 carbon atoms.

Specifically, Q may be the same or different and stands for monovalent organic groups of 6 to 30 carbon atoms, preferably 8 to 18 carbon atoms. If the number of carbon atoms is less than 6, the surfactant becomes so hydrophilic that a longer time is required in polymerizing to an organosilicone (A) with a high degree of polymerization corresponding to a viscosity of at least 300,000 mPa-s. If the number of carbon atoms is more than 30, the surfactant has a weak emulsifying power, failing to form a stable emulsion. Examples of suitable organic groups represented by Q include alkyl groups such as hexyl, heptyl, octyl, nonyl, decyl, undecyl, dodecyl, tridecyl, tetradecyl, pentadecyl, hexadecyl, heptadecyl, octadecyl, nonadecyl, eicosyl, docosanyl, cyclopentyl, cyclohexyl, and cycloheptyl; aryl groups such as phenyl, benzyl, tolyl, and naphthyl; and alkenyl groups such as oleyl. Inter alia, octyl, dodecyl, hexadecyl and octadecyl are preferred.

X is a halide ion such as $Cl^-$, $Br^-$ and $I^-$ or a monovalent carboxyl ion of 1 to 6 carbon atoms such as $HCOO^-$, $CH_3COO^-$ or $C_2H_5COO^-$. Inter alia, $Cl^-$, $HCOO^-$ and $CH_3COO^-$ are preferred.

The surfactant used herein should be of the monomethyl type. Surfactants of dimethyl and trimethyl types as represented by $Q_2(CH_3)_2N^+·X^-$ and $Q(CH_3)_3N^+·X^-$ are so hydrophilic that a longer time is required in polymerizing to an organosilicone (A) with a high degree of polymerization corresponding to a viscosity of at least 300,000 mPa-s.

An appropriate amount of the surfactant (B) added is 0.1 to 30 parts by weight per 100 parts by weight of the polydiorganosiloxane (A). Less than 0.1 pbw of component (B) is too small to stabilize the emulsion whereas more than 30 pbw of component (B) fails in polymerizing to an organosilicone (A) with a high degree of polymerization corresponding to a viscosity of at least 300,000 mPa-s. The preferred amount is 0.5 to 20 parts, and more preferably 1 to 15 parts by weight.

It is acceptable to add another surfactant for the purpose of enhancing the emulsion stability. Suitable other surfactants include nonionic surfactants such as polyoxyalkylene alkyl ethers, polyoxyalkylene alkyl phenyl ethers, and polyoxyalkylene fatty acid esters; cationic surfactants such as quaternary ammonium salts other than component (B) and alkylamine acetates; and amphoteric surfactants such as alkyl betaines and alkyl imidazolines.

In the emulsion composition of the invention, (C) water is used in an amount of 30 to 3,000 parts by weight, preferably 40 to 2,400 parts by weight per 100 parts by weight of component (A). Too small amounts of water do not form water-in-oil emulsions whereas too large amounts of water are uneconomical.

The cationic emulsion composition of the invention is prepared by dispersing the following components:

(D) 100 parts by weight of a cyclic organosiloxane of the general formula: [$R_2SiO$]$_x$ wherein R is a monovalent organic group as defined above and x is a positive number of 3 to 20 and/or a hydroxy-terminated polydiorganosiloxane of the general formula: HO—[$R_2SiO$]$_y$—H wherein R is a monovalent organic group as defined above and y is a positive number of 2 to 100, (E) 0 to 20 parts by weight of an organoalkoxysilane of the general formula: $(YO)_2SiR_2$ wherein Y is an alkyl group of 1 to 6 carbon atoms and R is a monovalent organic group as defined above, and (B) 0.1 to 30 parts by weight of a cationic surfactant of the general formula: $Q_3(CH_3)N^+·X^-$ wherein Q is each independently a monovalent organic group of 6 to 30 carbon atoms and X is a halogen atom or monovalent carboxyl group of 1 to 6 carbon atoms, in (C) 30 to 3,000 parts by weight of water to form an emulsion, allowing the emulsion to polymerize in the presence of an alkali catalyst at a temperature of 0 to 90° C. for 10 to 150 hours, and neutralizing the emulsion with an acidic compound.

The cyclic organosiloxane of the formula: $[R_2SiO]_x$ and/or the hydroxy-terminated polydiorganosiloxane of the formula: $HO—[R_2SiO]_y—H$ wherein R is a monovalent organic group as defined above, x is a positive number of 3 to 20, and y is a positive number of 2 to 100, serving as component (D), is a monomer from which the polydiorganosiloxane (A) is formed. If x exceeds 20 or if y exceeds 100, the emulsion resulting from the dispersing step is unstable and becomes separated during the course of polymerization. For this reason, x is not greater than 20 and y is not greater than 100.

The organoalkoxysilane serving as component (E) is another monomer from which the polydiorganosiloxane (A) is formed. It has the formula: $(YO)_2SiR_2$ wherein Y is an alkyl group of 1 to 6 carbon atoms and R is a monovalent organic group as defined above. Suitable alkyl groups of 1 to 6 carbon atoms represented by Y include methyl, ethyl, propyl, butyl, pentyl and hexyl, with methyl and ethyl being preferred.

It is acceptable to use a trialkoxysilane having the general formula: $(YO)_3SiR$ as long as this does not compromise softness and smoothness.

The amount of component (E) added is 0 to 20 parts by weight, preferably 0 to 15 parts by weight per 100 parts by weight of component (D) which is the cyclic organosiloxane and/or the hydroxy-terminated polydiorganosiloxane. Outside the range, too large amounts of component (E) fail in polymerizing to a polydiorganosiloxane (A) with a high degree of polymerization corresponding to a viscosity of at least 300,000 mPa-s.

Using a suitable emulsifier such as a homomixer, homogenizer, colloid mill, homo-disper or line mixer, the cyclic organosiloxane and/or the hydroxy-terminated polydiorganosiloxane as component (D), the organoalkoxysilane as component (E), the cationic surfactant as component (B) and water as component (C) are processed into a uniform emulsion. An alkali catalyst is then added to the emulsion whereupon polymerization is allowed to proceed at a temperature of 0 to 90° C. for 10 to 150 hours.

Examples of the alkali catalyst used herein include, but are not limited to, sodium hydroxide, potassium hydroxide, lithium hydroxide, potassium fluoride, ammonia, tetramethylammonium hydroxide, tetraethylammonium hydroxide, tetrapropylammonium hydroxide, tetrabutylammonium hydroxide, benzyltrimethylammonium hydroxide, tetrabutylphosphonium hydroxide, and trifluoromethylphenyltrimethylammonium hydroxide. Of these, sodium hydroxide, potassium hydroxide, tetramethylammonium hydroxide, tetrabutylammonium hydroxide, benzyltrimethylammonium hydroxide, and tetrabutylphosphonium hydroxide are preferred.

An appropriate amount of the alkali catalyst added is 0.01 to 5 parts by weight, preferably 0.05 to 1 part by weight per 100 parts by weight of the cyclic organosiloxane and/or the hydroxy-terminated polydiorganosiloxane as component (D).

If the cationic surfactant as component (B) can be converted to quaternary ammonium hydroxide using an ion exchange resin, the resulting quaternary ammonium hydroxide itself serves as an alkali catalyst component, eliminating a need for an extra alkali catalyst.

The polymerization temperature is in the range of 0° C. to 90° C. Below 0° C., the polymerization is retarded, becoming impractical. Above 90° C., the emulsion becomes unstable. The preferred temperature is 5° C. to 85° C.

The polymerization time is in the range of 10 to 150 hours. In less than 10 hours, the polymerization does not proceed to a sufficient extent. More than 150 hours is commercially unacceptable. The preferred time is 15 hours to 120 hours.

After the predetermined time of polymerization, the emulsion is neutralized with an acidic compound to quench the polymerization reaction. Suitable acidic compounds include hydrochloric acid, formic acid, acetic acid and propionic acid, with hydrochloric acid, formic acid and acetic acid being preferred. Neutralization can be achieved using an ion exchange resin instead of the acidic compound.

The cationic emulsion composition of high polymeric organosiloxane as produced by the above method is useful as textile treating agents, cosmetic ingredients and the like. When fibers, textiles, leather, paper, hair and the like are treated with the cationic emulsion composition, favorable properties including softness (or flexibility), smoothness (or slip), water repellency, and volume are imparted.

EXAMPLE

Examples of the invention are given below by way of illustration and not by way of limitation. All percents are by weight.

Example 1

Using a homomixer, 350 g of dimethylcyclosiloxane (average tetramer), 17.6 g of a solution of 85% trilaurylmethylammonium chloride in isopropyl alcohol (Arquad® 312-85, Lion Akzo Co., Ltd.), and 632.4 g of deionized water were uniformly dispersed. The emulsion was worked two times using a homogenizer under a pressure of 30 MPa. The emulsion was brought in contact with a basic anion exchange resin (Amberlite IRA900, Organo Co., Ltd.) for ion exchange of the trilaurylmethylammonium chloride. Then, the liquid temperature was increased to 70° C., at which polymerization took place for 16 hours. The liquid temperature was then lowered to 25° C., at which polymerization continued for 48 hours. This was neutralized with 20 g of acetic acid, yielding an emulsion A.

Example 2

An emulsion B was obtained as in Example 1 except that a hydroxy-terminated polydimethylsiloxane of the formula: $HO—[(CH_3)_2SiO]_{40}—H$ was used instead of the dimethylcyclosiloxane and the homogenizer pressure was 100 MPa.

Example 3

An emulsion C was obtained as in Example 1 except that 328 g of dimethylcyclosiloxane (average tetramer) and 22 g of glycidoxypropyldiethoxymethylsilane were used instead of 350 g of dimethylcyclosiloxane (average tetramer).

Example 4

An emulsion D was obtained as in Example 1 except that the polymerization conditions were changed. Polymerization took place at 70° C. for 16 hours, the liquid temperature was lowered to 25° C., at which polymerization continued for 24 hours, and the liquid temperature was then lowered to 5° C., at which polymerization continued for a further 80 hours.

Example 5

Using a homomixer, 350 g of dimethylcyclosiloxane (average tetramer), 52.8 g of a solution of 85% trilaurylmethylammonium chloride in isopropyl alcohol (Arquad 312-85, Lion Akzo Co., Ltd.), and 593.2 g of deionized water were uniformly dispersed. The emulsion was worked two times using a homogenizer under a pressure of 30 MPa. To the emulsion was added 4 g of an aqueous solution of 25% tetramethylammonium hydroxide. Then, the liquid temperature was increased to 70° C., at which polymerization took place for 16 hours. The liquid temperature was lowered to 25° C., at which polymerization continued for 24 hours. The liquid temperature was then lowered to 5° C., at which polymerization continued for a further 80 hours. This was neutralized with 8 g of acetic acid, yielding an emulsion E.

Example 6

An emulsion F was obtained as in Example 4 except that 20 g of a solution of 75% trioctylmethylammonium chloride in isopropyl alcohol (TOMAC®-75, Lion Akzo Co., Ltd.) and 630 g of deionized water were used instead of 17.6 g of a solution of 85% trilaurylmethylammonium chloride in isopropyl alcohol (Arquad 312-85, Lion Akzo Co., Ltd.) and 632.4 g of deionized water; and the amount of acetic acid was changed from 20 g to 27 g.

Example 7

An emulsion G was obtained as in Example 2 except that the polymerization conditions were changed such that polymerization took place at 15° C. for 72 hours.

Comparative Example 1

An emulsion H was obtained as in Example 1 except that 50 g of an aqueous solution of 30% cetyltrimethylammonium chloride (Quartamin® 60W, Kao Co., Ltd.) and 600 g of deionized water were used instead of 17.6 g of a solution of 85% trilaurylmethylammonium chloride in isopropyl alcohol (Arquad 312-85, Lion Akzo Co., Ltd.) and 632.4 g of deionized water; and the amount of acetic acid was changed from 20 g to 36 g.

Comparative Example 2

An emulsion I was obtained as in Comparative Example 1 except that the polymerization conditions were changed. Polymerization took place at 70° C. for 16 hours, the liquid temperature was lowered to 25° C., at which polymerization continued for 24 hours, and the liquid temperature was then lowered to 5° C., at which polymerization continued for a further 80 hours.

Comparative Example 3

An emulsion J was obtained as in Comparative Example 1 except that the polymerization conditions were changed. Polymerization took place at 70° C. for 16 hours, and the liquid temperature was lowered to 25° C., at which polymerization continued for 360 hours.

Comparative Example 4

An emulsion K was obtained as in Example 5 except that 50 g of an aqueous solution of 30% cetyltrimethylammonium chloride (Quartamin® 60 W, Kao Co., Ltd.) and 596 g of deionized water were used instead of 17.6 g of a solution of 85% trilaurylmethylammonium chloride in isopropyl alcohol (Arquad 312-85, Lion Akzo Co., Ltd.) and 632.4 g of deionized water.

Comparative Example 5

An emulsion L was obtained as in Comparative Example 4 except that 580 g of deionized water and 20 g of an aqueous solution of 25% tetramethylammonium hydroxide were used instead of 596 g of deionized water and 4 g of an aqueous solution of 25% tetramethylammonium hydroxide, respectively.

The emulsions of Examples 1 to 7 and Comparative Examples 1 to 5 were assessed for physical and other properties by the tests described below. The results are shown in Tables 1 and 2.

Viscosity of Silicone as Extracted

With stirring, 300 g of the emulsion was added to 2 L of isopropyl alcohol. The emulsion was thus broken for extracting the polydiorganosiloxane. The polydiorganosiloxane was dried at 105° C. for 3 hours and measured for viscosity at 25° C. by a BH type rotational viscometer.

Shelf Stability

The emulsion was held at 25° C. for 2 months, after which its outer appearance was visually observed.

○: intact

X: separated

Texture of Treated Cloth

The test uses polyester/cotton broadcloth and includes the steps: mixing of Emulsion A to L and water in a weight ratio of 2/98, immersion, squeezing, drying (100° C./2 min+150° C./2 min), and evaluation by finger touch (for flexibility and smoothness, compared with untreated cloth).

○: good

X: equal to untreated cloth

Luster and Smoothness of Treated Hair

The test uses a bundle of human hair and includes the steps: mixing of Emulsion A to L and water in a weight ratio of 10/90, immersion, rinse, drying (50° C./1 hr), and evaluation by visual observation and finger touch (for luster and smoothness, compared with untreated hair).

○: lustrous and smooth

Δ: fairly lustrous and smooth

X: equal to untreated hair

TABLE 1

| | | Example | | | | | |
|---|---|---|---|---|---|---|---|
| | | 1 | 2 | 3 | 4 | 5 | 6 |
| Composition (pbw) | Polydiorganosiloxane | 100 | 100 | 100 | 100 | 100 | 100 |
| | Trilaurylmethylammonium chloride | | | | | 12.9 | |
| | Trilaurylmethylammonium acetate | 4.3 | 4.3 | 4.3 | 4.3 | | |

TABLE 1-continued

|  |  | Example | | | | | |
|---|---|---|---|---|---|---|---|
|  |  | 1 | 2 | 3 | 4 | 5 | 6 |
|  | Trioctylmethylammonium acetate |  |  |  |  |  | 4.3 |
|  | Cetyltrimethylammonium chloride |  |  |  |  |  |  |
|  | Cetyltrimethylammonium acetate |  |  |  |  |  |  |
|  | Water | 181 | 181 | 181 | 181 | 171 | 180 |
| Polymerization time (hr) | at 70° C. | 16 | 16 | 16 | 16 | 16 | 16 |
|  | at 25° C. | 48 | 48 | 48 | 24 | 24 | 24 |
|  | at 15° C. |  |  |  |  |  |  |
|  | at 5° C. |  |  |  | 80 | 80 | 80 |
|  | Total | (64) | (64) | (64) | (120) | (120) | (120) |
| Viscosity of silicone extracted (mPa-s) |  | 1,000,000 | 1,200,000 | 800,000 | 1,600,000 | 620,000 | 580,000 |
| Non-volatile (%) @105° C./3 hr |  | 31.6 | 32.0 | 31.4 | 31.7 | 31.6 | 31.7 |
| Shelf stability |  | ○ | ○ | ○ | ○ | ○ | ○ |
| Texture of treated cloth |  | ○ | ○ | ○ | ○ | ○ | ○ |
| Luster and smoothness of treated hair |  | ○ | ○ | ○ | ○ | ○ | ○ |

TABLE 2

|  |  | Example | Comparative Example | | | | |
|---|---|---|---|---|---|---|---|
|  |  | 7 | 1 | 2 | 3 | 4 | 5 |
| Composition (pbw) | Polydiorganosiloxane | 100 | 100 | 100 | 100 | 100 | 100 |
|  | Trilaurylmethylammonium chloride |  |  |  |  |  |  |
|  | Trilaurylmethylammonium acetate | 4.3 |  |  |  |  |  |
|  | Trioctylmethylammonium acetate |  |  |  |  |  |  |
|  | Cetyltrimethylammonium chloride |  |  |  |  | 4.3 | 4.3 |
|  | Cetyltrimethylammonium acetate |  | 4.3 | 4.3 | 4.3 |  |  |
|  | Water | 180 | 181 | 181 | 181 | 181 | 180 |
| Polymerization time (hr) | at 70° C. |  | 16 | 16 | 16 | 16 | 16 |
|  | at 25° C. |  | 48 | 24 | 360 | 24 | 24 |
|  | at 15° C. | 96 |  |  |  |  |  |
|  | at 5° C. |  |  | 80 |  | 80 | 80 |
|  | Total | (96) | (64) | (120) | (376) | (120) | (120) |
| Viscosity of silicone extracted (mPa-s) |  | 530,000 | 53,000 | 38,000 | 340,000 | 31,000 | 38,000 |
| Non-volatile (%) @105° C./3 hr |  | 34.2 | 31.6 | 31.7 | 31.7 | 31.7 | 31.9 |
| Shelf stability |  | ○ | ○ | ○ | ○ | ○ | ○ |
| Texture of treated cloth |  | ○ | X | X | ○ | X | X |
| Luster and smoothness of treated hair |  | ○ | X | X | Δ | X | X |

Japanese Patent Application No. 2005-158971 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for preparing a cationic emulsion composition comprising the steps of dispersing components (D),(E),(B) and (C) to form an emulsion, allowing the emulsion to polymerize in the presence of an alkali catalyst at 0 to 90° C. for 10 to 150 hours, and neutralizing with an acidic compound, (D) 100 parts by weight of a cyclic organosiloxane of the general formula: $[R_2SiO]_x$ wherein R is each independently a monovalent organic group of 1 to 20 carbon atoms and x is a positive number of 3 to 20 and/or a hydroxy-terminated polydiorganosiloxane of the general formula: $HO-[R_2SiO]_y-H$ wherein R is as defined above and y is a positive number of 2 to 100, (E) 0 to 20 parts by weight of an organoalkoxysilane of the general formula: $(YO)_2SiR_2$ wherein Y is an alkyl group of 1 to 6 carbon atoms and R is as defined above, (B) 0.1 to 30 parts by weight of a cationic surfactant of the general formula: $Q_3(CH_3)N^+ \cdot X^-$ wherein Q is each independently a monovalent organic group of 6 to 30 carbon atoms selected from the group consisting of alkyl, aryl and alkenyl groups, and X is a halogen atom or monovalent carboxyl group of 1 to 6 carbon atoms, and (C) 30 to 3,000 parts by weight of water, thereby obtaining the cationic emulsion composition comprising (A) 100 parts by weight of a polydiorganosiloxane of the general formula: HO—[$R_2SiO$]$_n$—H wherein R is each independently a monovalent organic group of 1 to 20 carbon atoms and n is a positive number, having a viscosity of at least 300,000 mPa-s at 25° C., (B) 0.1 to 30 parts by weight of a cationic surfactant of the general formula: $Q_3(CH_3)N^+ \cdot X^-$ wherein Q is each independently a monovalent organic group of 6 to 30 carbon atoms selected from the group consisting of alkyl, aryl and alkenyl groups, and X is a halogen atom or monovalent carboxyl group of 1 to 6 carbon atoms, and (C) 30 to 3,000 parts by weight of water.

2. The method according to claim 1 wherein Q is each independently a monovalent organic group of 8 to 18 carbon atoms.

3. The method according to claim 1, wherein Q is each independently an alkyl group.

4. The method according to claim 1, wherein Q is each independently an aryl group.

5. The method according to claim 1, wherein Q is each independently an alkenyl group.

6. The method according to claim 1, wherein Q is each independently an octyl, dodecyl, hexadecyl or octadecyl group.

7. The method according to claim 1, wherein Q is a dodecyl group.

8. The method according to claim 1, wherein at least 90% of the R groups are methyl.

9. The method according to claim 1, wherein component (A) has a viscosity of at least 500,000 mPa-s at 25° C.

10. The method according to claim 1, wherein component (B) is present in an amount of 0.5 to 20 parts by weight.

11. The method according to claim 1, wherein component (B) is present in an amount of 1 to 15 parts by weight.

12. The method according to claim 1, wherein component (E) is present in an amount of 0 to 15 parts by weight.

13. The method according to claim 1, wherein the alkali catalyst is added in amount of 0.01 to 5 parts by weight per 100 parts by weight of the total of component (D).

14. The method according to claim 1, wherein the alkali catalyst is added in amount of 0.05 to 1 part by weight per 100 parts by weight of the total of component (D).

15. The method according to claim 1, wherein the emulsion is allowed to polymerize at 5 to 85° C.

16. The method according to claim 1, wherein the emulsion is allowed to polymerize for 15 to 120 hours.

17. The method according to claim 1, wherein component (D) comprises the cyclic organosiloxane.

18. The method according to claim 1, wherein component (D) comprises the hydroxy-terminated polydiorganosiloxane.

* * * * *